United States Patent [19]

Eden

[11] Patent Number: 5,181,145
[45] Date of Patent: Jan. 19, 1993

[54] OPTICAL IMAGING SYSTEM MADE FROM A SINGLE PIECE OF MATERIAL

[75] Inventor: Benjamin Eden, Haifa, Israel

[73] Assignee: State of Israel - Ministry of Defence Armament Development Authority, Haifa, Israel

[21] Appl. No.: 661,677

[22] Filed: Feb. 27, 1991

[30] Foreign Application Priority Data

Mar. 14, 1990 [IL] Israel ..................................... 93738

[51] Int. Cl.⁵ .............................................. G02B 5/10
[52] U.S. Cl. .................................. 359/859; 359/366; 359/857
[58] Field of Search ............... 359/399, 857, 858, 859, 359/641, 366, 365, 364; 250/330

[56] References Cited

U.S. PATENT DOCUMENTS

| | | | |
|---|---|---|---|
| 2,485,345 | 10/1949 | Ackerman. | |
| 3,064,526 | 11/1962 | Lindsay | 359/859 X |
| 4,554,448 | 11/1985 | Sillitto | 359/859 X |
| 4,697,084 | 9/1987 | Fox | 359/859 X |
| 4,751,571 | 6/1988 | Lillquist | 250/330 X |
| 4,792,685 | 12/1988 | Yamakawa. | |
| 4,867,547 | 9/1989 | Vogl. | |

FOREIGN PATENT DOCUMENTS 2068585 8/1981 United Kingdom.
2119112 11/1983 United Kingdom.

OTHER PUBLICATIONS

Fu Shih et al, Aplantix two-mirror collimator, SPIE, vol. 554, Int'l. Lens Design Conference, 1985, pp. 265-272.

Primary Examiner—Constantine Hannaher
Assistant Examiner—Edward J. Glick
Attorney, Agent, or Firm—Ladas & Parry

[57] ABSTRACT

An integrally-formed optical imaging system including at least two facing, reflective surfaces defining a single optical axis and formed on a single piece of material.

13 Claims, 7 Drawing Sheets

OPTICAL IMAGING SYSTEM MADE FROM A SINGLE PIECE OF MATERIAL

FIELD OF THE INVENTION

The present invention relates to optical systems in general, and, in particular, to optical imaging systems.

BACKGROUND OF THE INVENTION

Optical imaging systems, such as the Cassegrain optical system, are well known. Such systems employ generally circular, facing primary and secondary mirrors arranged coaxially about an optical axis, in a rigid mounting. The primary mirror has a diameter significantly larger than the diameter of the secondary mirror and defines a central aperture through which the optical axis extends. Beams of radiation striking the primary mirror are reflected towards the secondary mirror, from where they are reflected back towards a focus of the secondary mirror, lying on the optical axis. Appropriate imaging apparatus may be arranged at the focus.

Optical imaging systems such as described, have to meet very high criteria of accuracy. Imaging systems for military applications must also meet requirements of ruggedness, compactness, reliability and insensitivity to changes in the thermal environment. The accuracy criteria are determined both by the final geometry of the reflective surfaces defined by the mirrors, and the skill by which the mirrors are assembled in their mounting. Such mounting and assembly is exceeding time consuming and thus expensive. While the geometrical accuracy of the reflective surfaces is a function of the machining process by which the mirrors are formed, assembly of the mirrors in their mounting is performed manually, and the overall system accuracy is thus largely dependent on the skill of the person or persons assembling the system.

Conventional system errors are as follows:
Centering between the two mirrors in relation to the optical axis: 0.05 mm
Perpendicularity of the two mirrors to the optical axis: 0.05 mm
Distance between mirror traces: 0.1 mm.

As will be appreciated by persons skilled in the art, while system errors such as listed above may be acceptable for many applications, single axis optical systems having inherent system errors such as those listed are not suitable for imaging applications wherein greater accuracy is needed.

Furthermore, the very high complexity in manually assembling these optical systems so as to maximize their accuracy takes many hours and results in a relatively high cost product.

In an article entitled "Aplanatic two-mirror compact collimator" by I.-Fu Shih et al SPIE Vol. 554, International Lens Design Conference (1985), pp 265-272, there is described a collimator, which is not suitable for imaging but which employs two mirrors diamond turned on a single piece of metal.

SUMMARY OF THE INVENTION

The present invention seeks to provide an improved optical imaging system.

There is provided, therefore, according to a preferred embodiment of the invention, an integrally-formed optical imaging system including two facing, reflective surfaces defining a single optical axis and formed on a single piece of material.

Additionally in accordance with a preferred embodiment of the invention, the two reflective surfaces include a first reflective surface defining a central aperture through which the optical axis extends; and a second reflective surface formed coaxially with the first reflective surface and defining a focus lying on the optical axis, radiation impinging on the first reflective surface being reflected therefrom towards the second reflective surface and being further reflected from the second reflective surface towards the focus.

In accordance with one embodiment of the invention, the system is a Cassegrain reflective telescope, while, according to an alternative embodiment, the system may be Gregorian optical system.

Additionally in accordance with a preferred embodiment of the invention there is provided a multi-spectral optical imaging system comprising the above-described optical imaging system and also beamsplitting apparatus and plural detectors, each operating at a different optical wavelength.

It is a particular feature of the invention, that shared reflective optics are employed for both wavelengths.

Further in accordance with a preferred embodiment of the invention there is provided a plural field-of-view optical imaging system comprising the above-described optical imaging system and also including beamsplitting apparatus and plural detectors, each viewing a different field of view. Refractive optics may be introduced in front of one or more detectors to define the plural fields of view.

The apparatus of the present invention meets requirements of ruggedness, compactness, reliability and insensitivity to changes in the thermal environment.

BRIEF DESCRIPTION OF THE DRAWINGS

The present invention will be more fully understood and appreciated from the following detailed description, taken in conjunction with the drawings, in which.

DETAILED DESCRIPTION OF THE INVENTION

Reference is now made to FIGS. 1-4, in which are shown various views of an integrally-formed single axis optical imaging system, referenced generally 10, constructed in accordance with the present invention.

The optical imaging system illustrated in FIGS. 1-4 is a Cassegrain telescope, although the optical system of the invention may alternatively be a different type of optical system, such as a Gregorian system. A particular advantage of the present invention over known art is that as the entire optical system is constituted by a single optical element, no manual assembly thereof is required. System 10, therefore, not only takes less time to manufacture, but system errors such as introduced into conventional single axis optical systems by the manual assembly thereof, are totally eliminated. This will become apparent from the typical system properties listed hereinbelow.

System 10 may be made from a single piece of metal, on which are formed primary and secondary, facing, machined, reflective surfaces, respectively referenced 12 and 14 and arranged across a common optical axis, referenced 16. Preferably, the primary and secondary reflective surfaces are formed by diamond turning. Alternatively, primary surface 12 may be formed by replication techniques.

Each of the reflective surfaces typically has an external configuration that is circular when projected parallel to the optical axis. As illustrated, the primary reflective surface 12 has a diameter that is larger than that of the secondary reflective surface 14. Primary reflective surface 12 defines a central aperture 18 (FIGS. 3A-4) that is coaxial with the primary and secondary reflective surfaces 12 and 14.

As will be appreciated by one skilled in the art, the primary and secondary reflective surfaces are preferably positioned such that the focus of the primary reflective surface coincides, at point 19 (FIGS. 3A and 3B), with the first focus of the secondary reflective surface.

Accordingly, in the present embodiment, secondary reflective surface 14 is configured to have a second focus 20, coincident with optical axis 16, whereat an image is formed. As diagrammatically illustrated in FIGS. 3A and 3B, beams of radiation, referenced 22 and 23, impinging on the primary reflective surface 12 are reflected therefrom towards the secondary reflective surface 14 and are further reflected from the secondary reflective surface towards focus 20.

The primary and secondary reflective surfaces are connected via a plurality of elongate rib members 24, defining a spider, which define therebetween a plurality of openings 26 communicating with the central aperture 18 of the primary reflective surface so as to enable passage of the beams of radiation reflected from the secondary reflective surface towards focus 20. As known in the art, single axis optical systems may also require baffles to prevent stray radiation from flooding the image area. This is true particularly when a relatively large field of view is required. Accordingly, there is also provided an axially aligned cylindrical portion 25 which constitutes a baffle, being configured to prevent, at least partially, the impingement of stray radiation on the secondary reflective surface 14.

Figure 1:
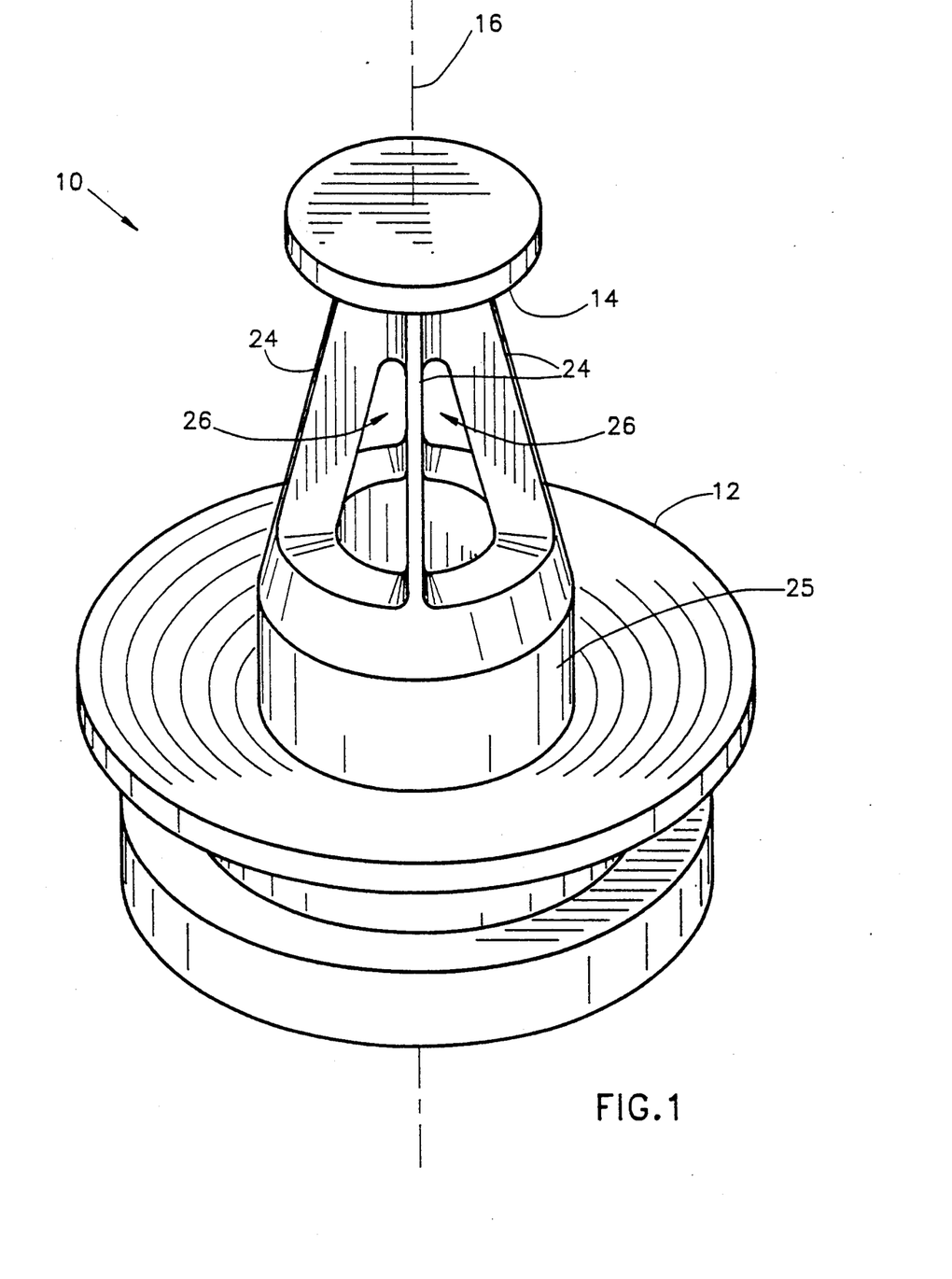
FIG. 1 is a perspective view of an optical imaging system constructed according to a preferred embodiment of the invention.
Figure 2:
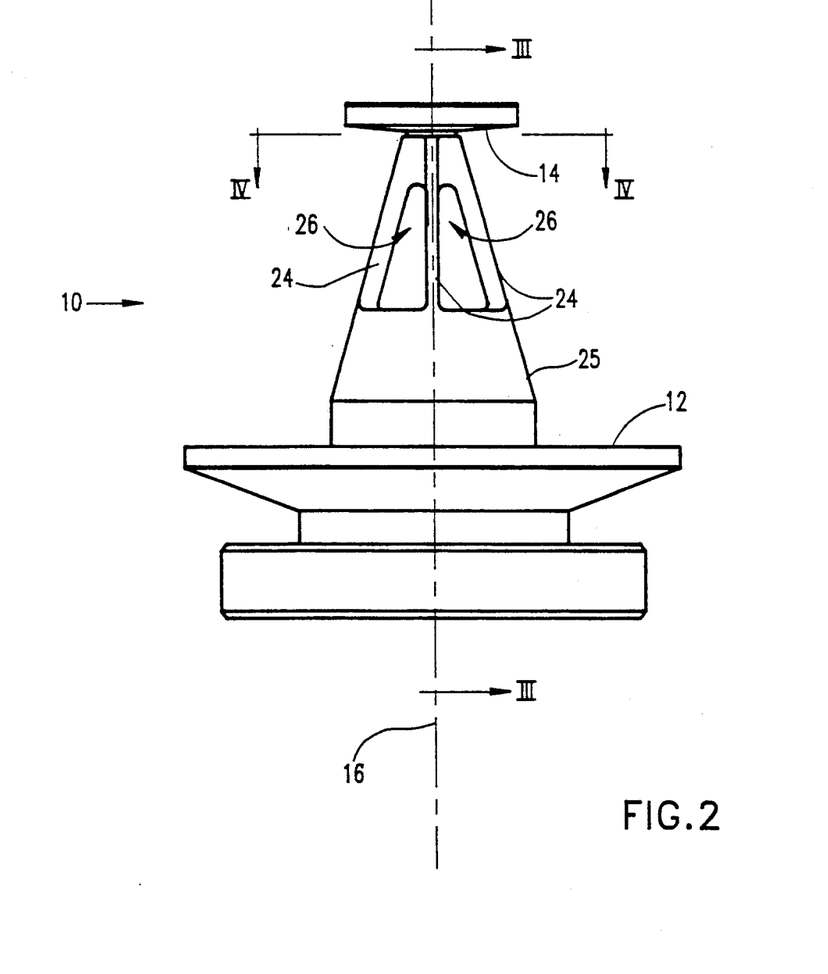
FIG. 2 is a side elevational view of the system illustrated in FIG. 1 and showing a system configuration in accordance with one embodiment of the invention.
Figure 3A:
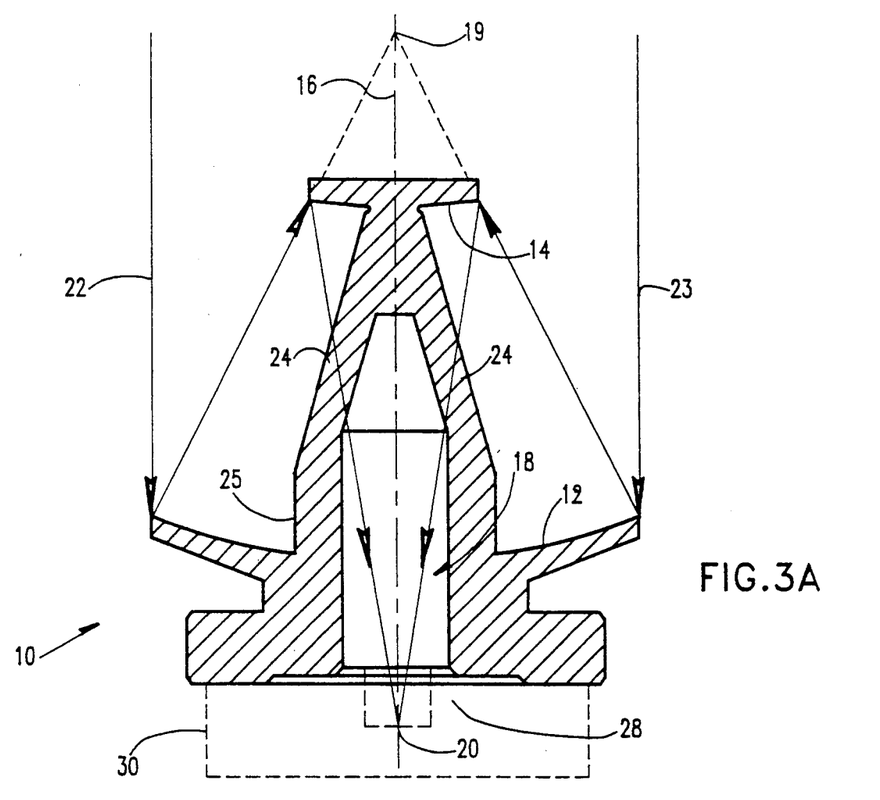
FIG. 3A is a sectional view of the system illustrated in FIGS. 1 and 2, taken along line III—III in FIG. 2.
Figure 3B:
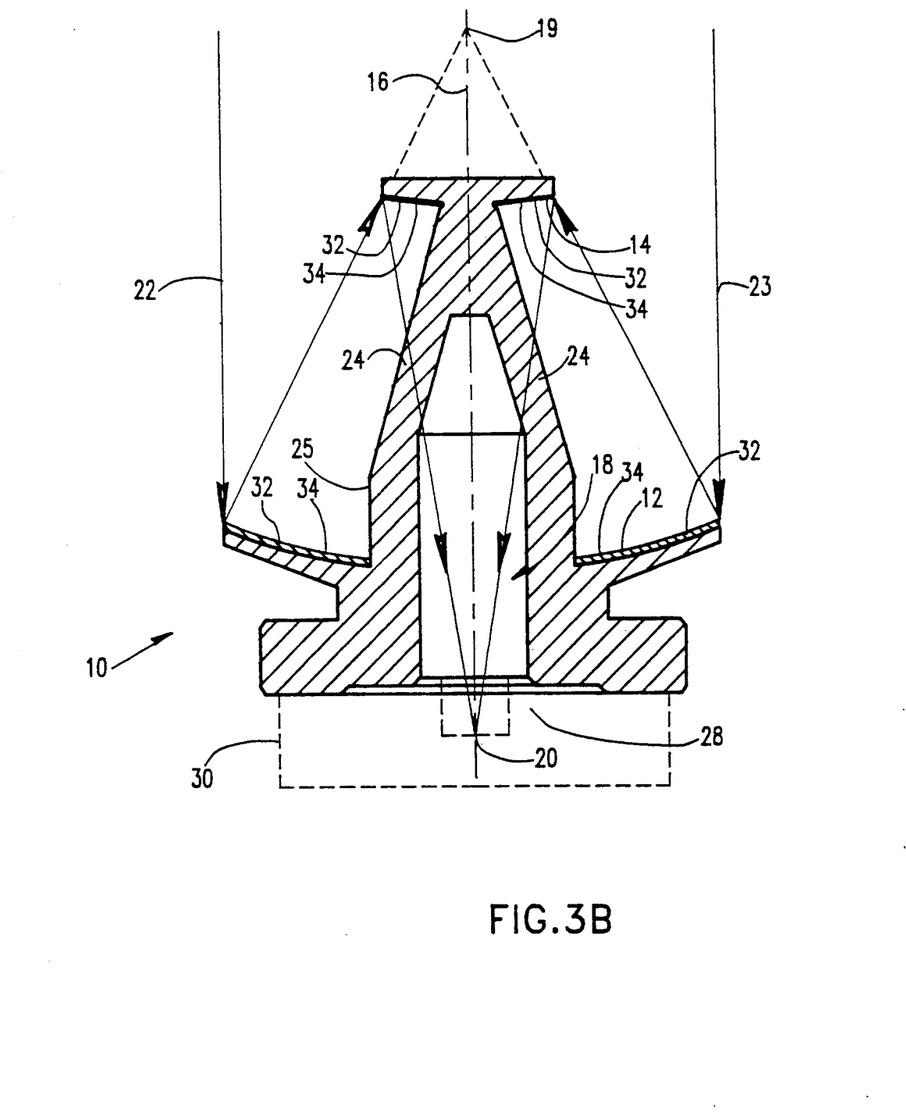
FIG. 3B is a sectional view corresponding to the view of FIG. 3A, but wherein the illustrated system is constructed according to an alternative embodiment of the invention.
Figure 4:
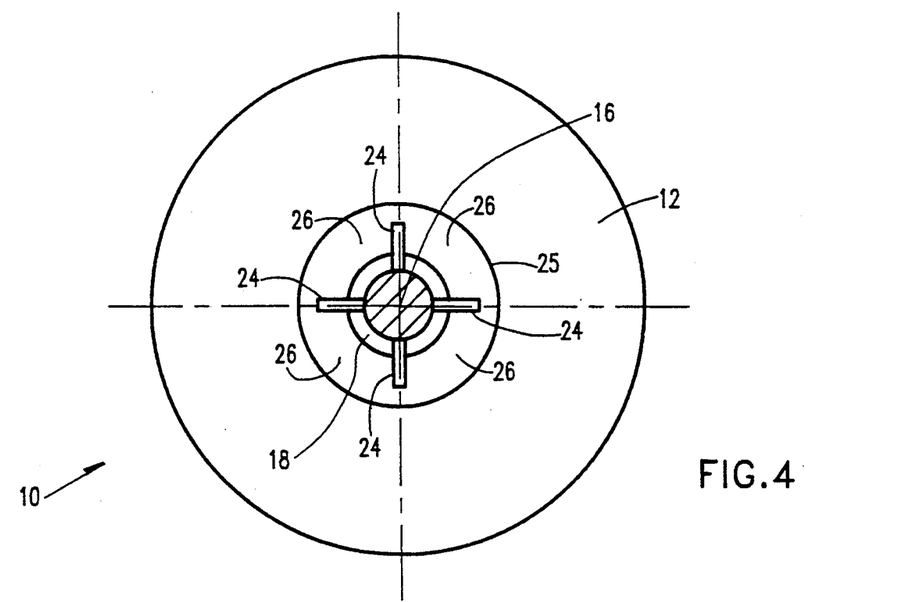
FIG. 4 is a sectional view illustration of the system illustrated in FIGS. 1 and 2, taken along line IV—IV in FIG. 2.

As illustrated most clearly in FIG. 3A, the single optical element constituting system 10 is configured at a rear portion 28 thereof to permit the mounting thereon of imaging apparatus, indicated schematically by outline 30, in proximity to the focus 20 of the secondary reflective surface. The configuration of rear portion 28 is for example only, and rear portion 28 may be formed with any suitable configuration for enabling the mounting of any appropriate imaging apparatus.

According to a preferred embodiment of the invention, the reflective surfaces are aspheric, although, according to an alternative embodiment, one or both of the surfaces may be spherical. When system 10 is, as in the embodiment of FIGS. 1-4, constructed as a Cassegrain system, the primary reflective surface 12 is typically parabolic, and the secondary reflective surface 14 is typically hyperboloid. Alternatively both surfaces may be hyperboloid in a Cassegrain system.

Referring now to FIGS. 1-4, although the reflective surfaces are typically formed directly on a single portion of metal, a metal coating 32, (illustrated in FIG. 3B in exaggerated scale), may be coated onto unpolished surfaces 34 prior to diamond turning, such that the reflective surfaces are actually formed on the coating, rather than on the 'base' material.

The base material may be a metal, such as a suitable nonferrous metal, for example, aluminum, copper, brass, molybdenum and or any suitable nonferrous alloy. Alternatively, the base material may be a nonmetal material, e.g. beryllium, or any suitable composite material. The coating may be any suitable nonferrous metal, for example, copper, nickel, brass, silver, gold, or cadmium.

As outlined briefly hereinabove, manufacture of an optical system according to the present invention results in an optical system with properties that are better than those achieved by conventional manufacture, in which two optical elements defining their respective reflective surfaces are manually assembled on a base prior to being fixed into position thereon.

Typical properties of a Cassegrain optical system constructed according to the present invention are as follows:

power—approximately lambda/4, at a wavelength lambda=0.6328 $\mu$m;

irregularity—approximately lambda/4, at a wavelength lambda=0.6328 $\mu$m;

accuracy of centering of the primary and secondary reflective surfaces relative to the optical axis— preferably approximately 0.2 $\mu$m and at least better than 0.05 mm;

accuracy of perpendicularity of the primary and secondary reflective surfaces to the optical axis—preferably approximately 0.2 $\mu$m and at least better than 0.05 mm; and accuracy of the distance between the traces of the primary and secondary reflective surfaces—approximately 0.05 mm.

Figure 5:
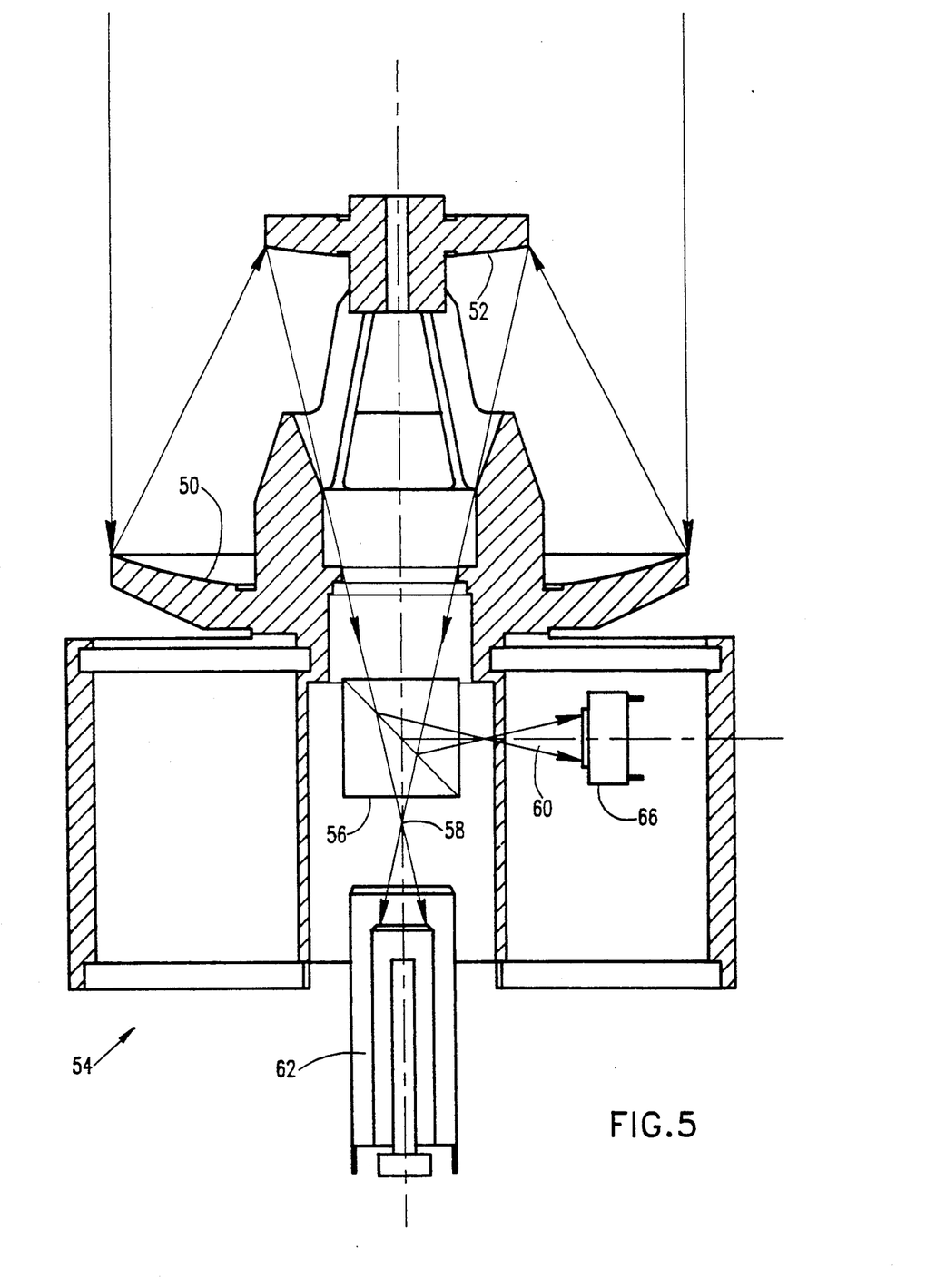
FIG. 5 is a sectional illustration of a bi-spectral optical imaging system constructed and operative in accordance with a preferred embodiment of the present invention.

Reference is now made to FIG. 5 which is a sectional illustration of a bi-spectral optical imaging system constructed and operative in accordance with a preferred embodiment of the present invention. As in the embodiments described above, respective primary and secondary surfaces 50 and 52 are formed on a single piece of material, as by diamond turning. In addition to the overall configuration which is similar to that described hereinabove, the single piece of material also includes a mounting portion 54 onto which is mounted a beam splitter 56, typically of the dichroic type.

The beam splitter 56 receives radiation reflected from the secondary reflecting surface and defines two output beams 58 and 60. Beam 58 is directed typically to an IR detector 62, while beam 60 is directed, typically to a visible spectrum detector 66, which may be a CCD detector or any other detector, such as a laser beam detector. In one embodiment, detectors 62 and 66 may both be IR detectors, operative in different wavelength ranges, such as 3-5 microns and 8-12 microns.

It is appreciated that the system of FIG. 5 may be operative for simultaneous detection at more than two wavelengths by provision of suitable beam splitting apparatus.

Figure 6:
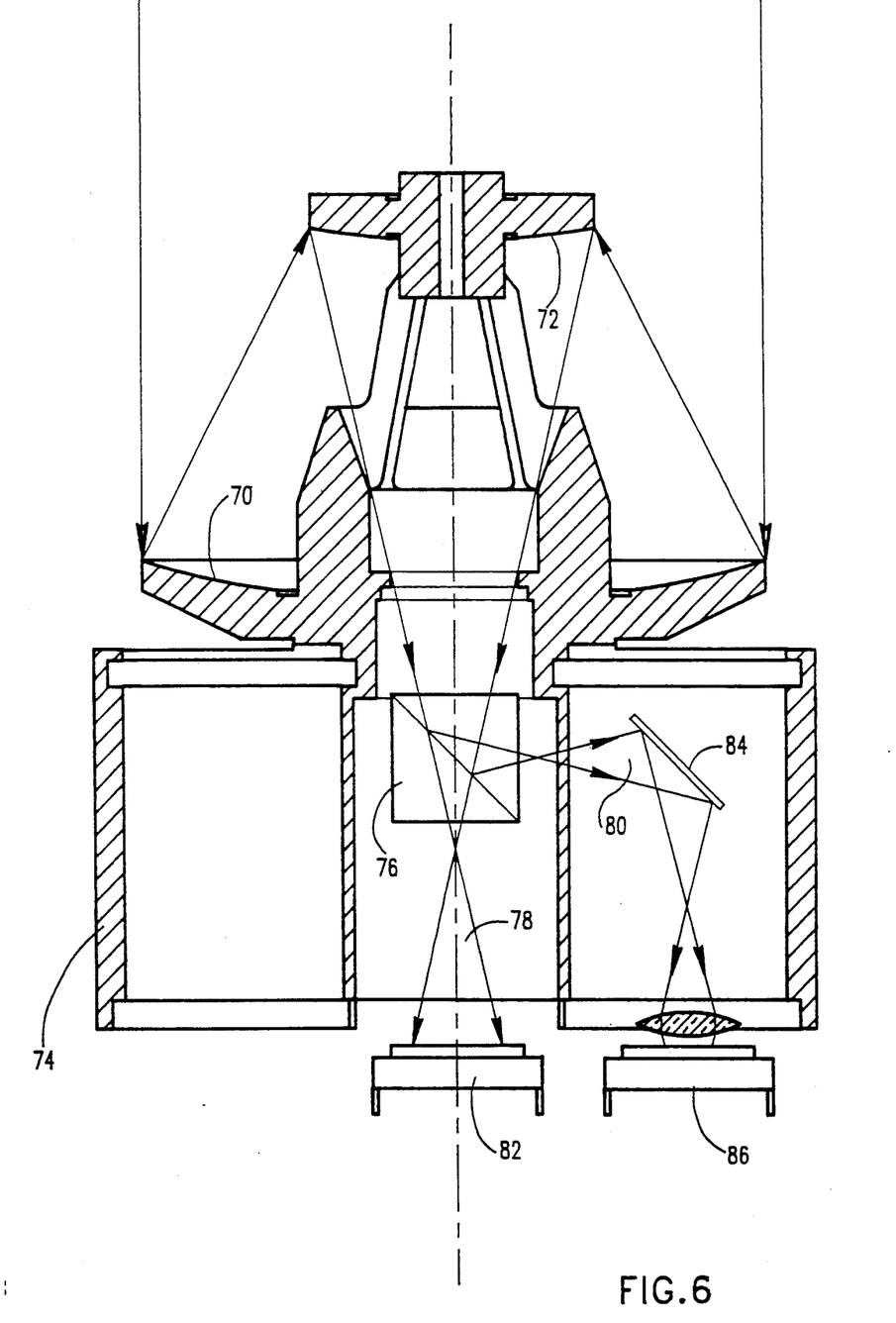
FIG. 6 is a sectional illustration of a two-field of view optical imaging system constructed and operative in accordance with a preferred embodiment of the present invention.

Reference is now made to FIG. 6 which is a sectional illustration of a two-field of view optical imaging system constructed and operative in accordance with a preferred embodiment of the present invention. As in the embodiments described above, respective primary and secondary surfaces 70 and 72 are formed on a single piece of material, as by diamond turning. In addition to the overall configuration which is similar to that described hereinabove, the single piece of material also includes a mounting portion 74 onto which is mounted a beam splitter 76.

The beam splitter 76 receives radiation reflected from the secondary reflecting surface and defines two output beams 78 and 80. Beam 78 is directed typically to a first detector 82, such as a wide field of view CCD detector. Beam 80 is directed, typically via a folding mirror 84 to a second detector 86 which is typically a narrow field of view CCD detector. It is appreciated that any two detectors having different fields of view may be employed in accordance with the present invention. For example, a wide field of view detector may have a 5 degree field of view and the narrow field of view detector may have a 1 degree field of view.

It is appreciated that the system of FIG. 6 may be operative for simultaneous detection at more than two fields of view by provision of suitable beam splitting apparatus.

It is appreciated that the optical imaging systems described hereinabove are typically non-scanning systems and thus the detectors employed are staring arrays. Alternatively, the present invention may be used with a scanning device and appropriate detector configurations.

Figure 7:
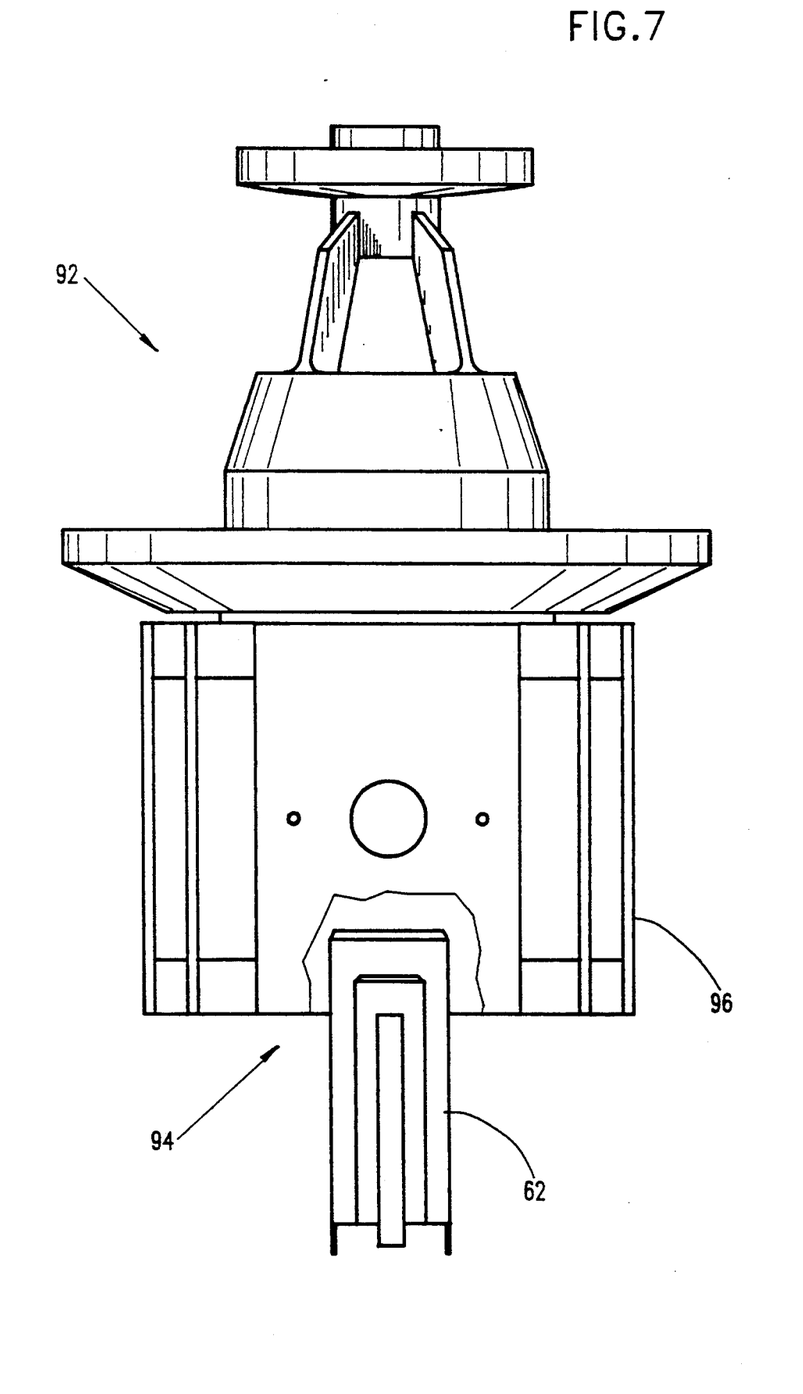
FIG. 7 is a side view illustration of the system of FIG. 5 and of FIG. 6.

Reference is now made to FIG. 7, which illustrates the outer configuration of a system of the type of FIGS. 5 and 6. It may be seen that signal processing electronics boards 96 may be conveniently and compactly mounted on the outside of the single piece of material 92, particularly at the outside of the mounting portion thereof 94.

It will be appreciated by persons skilled in the art that the scope of the present invention is not limited by what has been specifically shown and described hereinabove by way of example. The scope of the present invention is limited rather, solely by the claims, which follow:

I claim:

1. An optical imaging system integrally-formed on a single piece of material, comprising:
    at least a first and second facing, reflective surfaces defining a single optical axis,
    said first reflective surface defining a central aperture through which said optical axis extends and said second reflective surface formed coaxially with said first reflective surface and defining a focus lying on said optical axis,
    radiation impinging on said first reflective surface being reflected therefrom towards said second reflective surface and further reflected from said second reflective surface towards said focus; and
    a plurality of elongate rib members integrally formed with said first and second reflective surfaces, said plurality of elongate rib members defining therebetween a plurality of openings communicating with said central aperture, so as to enable passage of radiation reflected from said second reflective surface to said focus thereof.

2. A system according to claim 1, and wherein said single piece of material also defined baffle means disposed between said first reflective surface and said rib members, said baffle means being operative to at least partially prevent the impingement on said second reflective surface of stray radiation.

3. A system according to claim 1, and wherein said single piece of material further defines means for mounting imaging apparatus in association with said focus of said second reflective surface.

4. A system according to claim 1, and wherein at least one of said first and second reflective surfaces is aspheric.

5. A system according to claim 1, and wherein said system is a Cassegrainian system.

6. A system according to claim 5, and having at least one of the following properties:
    accuracy of centering of said first and second reflective surfaces relative to said optical axis better than approximately 0.05 mm;
    accuracy of perpendicularity of said first and second reflective surfaces to said optical axis of better than approximately 0.05 mm; and
    accuracy of the distance between the traces of said first and second reflective surfaces of better than approximately 0.1 mm.

7. A system according to claim 5, and having at least one of the following properties:
    accuracy of centering of said first and second reflective surfaces relative to said optical axis of approximately 0.2 $\mu$m;
    accuracy of perpendicularity of said first and second reflective surfaces to said optical axis of approximately 0.2 $\mu$m; and
    accuracy of the distance between the traces of said first and second reflective surfaces of approximately 0.05 mm.

8. A system according to claim 1 and also comprising:
    beamsplitting means receiving radiation reflected from said second reflective surfaces; and
    plural detectors, each operating at a different optical wavelength, each receiving radiation from said beamsplitting means.

9. A system according to claim 8 and wherein at least one of said plural detectors is operative for detecting laser radiation.

10. A system according to claim 1 and also comprising:
    beamsplitting means receiving radiation reflected from said second reflective surfaces; and
    plural detectors, each having a different field of view, each receiving radiation from said beamsplitting means.

11. An optical system according to claim 1 and also comprising electronic circuitry mounted onto said single piece of material.

12. A system according to claim 1 wherein each of said reflective surfaces has an external configuration that is generally circular when projected parallel to said optical axis, the diameter of said first reflective surface being greater than the diameter of said second reflective surface.

13. A system according to claim 1, and wherein said single piece of material is metallic and said reflective surfaces are diamond turned surfaces on said single piece of material.

* * * * *